United States Patent
Jakubiuk (10) Patent No.: US 11,494,208 B2
(45) Date of Patent: Nov. 8, 2022

(54) MULTIFORMAT DATA GENERATION FOR NEURAL NETWORK

(71) Applicant: ONSPECTA, INC., Redwood City, CA (US)

(72) Inventor: Victor Jakubiuk, San Francisco, CA (US)

(*) Notice: Subject to any disclaimer, the term of this patent is extended or adjusted under 35 U.S.C. 154(b) by 49 days.

(21) Appl. No.: 17/204,874

(22) Filed: Mar. 17, 2021

(65) Prior Publication Data

US 2021/0294625 A1 Sep. 23, 2021

Related U.S. Application Data (60) Provisional application No. 62/990,497, filed on Mar. 17, 2020.

(51) Int. Cl.
  *G06F 9/455* (2018.01)
  *G06N 3/10* (2006.01)

(52) U.S. Cl.
  CPC .......... *G06F 9/45516* (2013.01); *G06N 3/10* (2013.01)

(58) Field of Classification Search
  CPC ........ G06F 9/45516; G06N 3/10; G06N 3/02; G06N 3/06
  See application file for complete search history.

(56) References Cited

U.S. PATENT DOCUMENTS

2018/0096226 A1* 4/2018 Aliabadi .................. G06N 3/10
2021/0004252 A1* 1/2021 Liu .......................... G06N 20/00

OTHER PUBLICATIONS

Linh Le, "Deep Embedding Kernel", May 24, 2018, Elsevier (Year: 2018).*
Kim-Meow Liew, "Parallel and Distributed Computing: Applications and Technologies", 5th International Conference, PDCAT 2004 (Year: 2004).*

* cited by examiner

*Primary Examiner* — Wei Y Zhen
*Assistant Examiner* — Amir Soltanzadeh
(74) *Attorney, Agent, or Firm* — Cognition IP, P.C.; Edward Steakley; Aroon Karuna (57) ABSTRACT

Disclosed are systems and methods for efficiently processing artificial intelligence networks. In some embodiments, a just-in-time (JIT) compiler can determine an efficient input data format for a second kernel or microkernel, which is to digest the output of a first kernel or microkernel. The JIT compiler can generate the first kernel or microkernel with an embedded postprocessor, which can dynamically generate a data structure in the efficient data format as the first kernel or microkernel generates its output. The embedded postprocessor can receive the output stream of the first kernel, individually or in portions and can dynamically populate a data structure in the determined efficient data format to be digested by the second kernel or microkernel.

19 Claims, 6 Drawing Sheets

MULTIFORMAT DATA GENERATION FOR NEURAL NETWORK

CROSS-REFERENCE TO RELATED APPLICATIONS

This application claims the benefit of U.S. Provisional Application 62/990,497, filed on Mar. 17, 2020, which is hereby incorporated by reference in its entirety.

BACKGROUND

Field

This invention relates generally to the field of artificial intelligence (AI) processors and more particularly to AI processors optimized for efficient processing of neural networks.

Description of the Related Art

Artificial intelligence (AI) networks, such as neural networks, deep learning, machine learning, convolutional neural networks (CNNs) and others have recently contributed substantially to various technical fields and are widely in use. Fields such as autonomous driving, speech and language processing and others have benefited greatly from advances in AI. Nonetheless almost any corner of industry and economy can greatly benefit from incorporation and use of AI techniques.

Often AI techniques require handling and processing complex and/or voluminous data structures, such as vectors, matrixes, tensors and multidimensional data structures having hundreds, thousands or millions of internal data elements. Common operations of AI can include basic mathematical functions, including addition, multiplication, subtraction, division, or more complex operations, such as matrix multiplication, convolution, and others, which operate on these complex or voluminous data structures. Various hardware platforms are used to execute and implement AI networks. Those include general-purpose central processing units (CPUs), graphical processing units (GPUs), tensor processing units (TPUs) and others.

Existing compilers translate the code of an AI network to hardware instructions, so the hardware can execute the instructions and implement the network. Often the translation can include converting data from one format to another for various reasons, including efficiency or compatibility. The voluminous or complex nature of the data structures in AI networks can make conversion a costly operation within an AI network and can make the implementation of the AI network less efficient. Consequently, there is a need for systems and methods that can handle data format conversions within an AI network more efficiently.

SUMMARY

In one aspect, a computer-implemented system of compiling AI network code to hardware instructions is disclosed. The system includes: a plurality of kernels, wherein each kernel translates an operation of the AI network to hardware instructions to execute the operation in the hardware, wherein an output of a kernel feeds as input into another kernel, wherein each kernel accepts an input data in an input data format and outputs data in an output data format; and a just-in-time (JIT) compiler configured to generate and plug a postprocessor module in a first kernel, wherein the postprocessor module is configured to dynamically and at run-time determine an efficient input data format of a second kernel and dynamically and at run-time convert an output data stream of the first kernel from a first data format to a second data format, wherein the second data format comprises the efficient input data format of the second kernel.

In some embodiments, converting dynamically and at run-time includes the postprocessor module populating an output data structure with the output data stream of the first kernel in the second data format as the first kernel generates the output data stream and/or partial output data stream, wherein the second data format comprises the input data format of the second kernel.

In one embodiment, the system further includes a plurality of postprocessor modules plugged in one or more kernels, wherein each postprocessor is configured to receive the output stream of a kernel and populate a data structure in a data format compatible with input data format of a subsequent kernel, and wherein the plurality of postprocessors are configured to optimize end-to-end execution of the neural network on the hardware.

In another embodiment, determining the input data format of a second kernel is at least partly based on determining the hardware on which the hardware instructions are to be executed.

In one embodiment, the hardware can include a CPU, GPU or TPU.

In some embodiments, the data formats include NHWC or NCHW.

In one embodiment, the kernels include a plurality of microkernels or the kernels are microkernel s.

In some embodiments, the AI network includes a neural network.

In some embodiments, an ahead of time (AOT) compiler, instead of the JIT compiler, is used to generate and plug the postprocessor in the first kernel (or microkernel)

In another aspect, another computer-implemented system of compiling AI network code to hardware instructions is disclosed. The system includes: a plurality of kernels, wherein each kernel translates an operation of the AI network to hardware instructions to execute the operation in the hardware, wherein an output of a kernel feeds as input into another kernel, wherein each kernel accepts an input data in an input data format and outputs data in an output data format; and a just-in-time (JIT) compiler configured to generate and plug a preprocessor module in a first kernel, wherein the preprocessor module is configured to dynamically and at run-time determine an output data format of a second kernel and dynamically and at run-time convert an output data stream of the second kernel from a first data format to a second data format, wherein the second data format comprises the input data format of the first kernel.

In some embodiments, converting dynamically and at run-time includes the preprocessor module populating an input data structure with the output data stream of the second kernel in the second data format as the second kernel generates the output data stream and/or partial output data stream, wherein the second data format comprises the input data format of the first kernel.

In one embodiment, an AOT compiler, instead of the JIT compiler, is used to generate and plug the preprocessor module into the first kernel (or microkernel).

In another aspect, a computer-implemented method of compiling AI network code to hardware instructions is disclosed. The method includes: translating operations of an AI network to hardware instructions, with a plurality of kernels, wherein each kernel translates an operation of the AI network to hardware instructions to execute the operation in the hardware, wherein an output of a kernel feeds as input into another kernel, wherein each kernel accepts an input data in an input data format and outputs data in an output data format; and generating, with a just-in-time (JIT) compiler, a postprocessor module in a first kernel, wherein the postprocessor module is configured to dynamically and at run-time determine an efficient input data format of a second kernel and dynamically and at run-time convert an output data stream of the first kernel from a first data format to a second data format, wherein the second data format comprises the efficient input data format of the second kernel.

In some embodiments, converting dynamically and at run-time includes the postprocessor module populating an output data structure with the output data stream of the first kernel in the second data format as the first kernel generates the output data stream and/or partial output data stream, wherein the second data format comprises the input data format of the second kernel.

In one embodiment, the method further includes generating a plurality of postprocessor modules and embedding them in one or more kernels, wherein each postprocessor is configured to receive the output stream of a kernel and populate a data structure in a data format compatible with input data format of a subsequent kernel, and wherein the plurality of postprocessors are configured to optimize end-to-end execution of the neural network on the hardware.

In one embodiment, determining the input data format of a second kernel is at least partly based on determining the hardware on which the hardware instructions are to be executed.

In another embodiment, the hardware can include a CPU, GPU or TPU.

In some embodiments, the data formats can include NHWC or NCHW.

In one embodiment, the kernels comprise a plurality of microkernels or the microkernels are used instead of the kernels, or a combination of them are used.

In some embodiments, an AOT compiler is used in lieu of a JIT compiler.

BRIEF DESCRIPTION OF THE DRAWINGS

These drawings and the associated description herein are provided to illustrate specific embodiments of the invention and are not intended to be limiting.

DETAILED DESCRIPTION

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

AI networks, such as neural networks, can consist of computational graphs essentially, with nodes, hubs and connections. Each hub computes something in an input data to produce an output and within neural networks there can be hundreds or thousands of these hubs. Operators of AI networks are interested in making them as efficient as possible. Two approaches for implementing or coding an AI workload can be outlined, with both having advantages and disadvantages.

One approach to coding an AI network is by designing and optimizing the software code implementing the AI network for a target hardware. For example, some workloads can be coded to target running the AI network on a central processing unit (CPU). Other AI networks may be coded and optimized for running on graphical processing units (GPUs). Furthermore, each AI network can include a variety of operations, including additions, multiplications, scalar or vector operations, matrix operations, tensor operations and others. Kernels can be used to implement one or more AI network operations, which are sometimes termed "ops". For example, a kernel can be a program code implementing matrix multiplication, an inverse function or any other op, ops or combination of ops that may be found in an AI network. With the hardware-specific approach of writing code for AI networks, kernel codes are written by human programmers based on the specification of the hardware on which the kernels are going to run on. Consequently, a kernel for a neural network will have to be rewritten if the network is to run on a different hardware platform. Hardware-specific kernels can be efficient, as their underlying code is written with their running time hardware in mind. Therefore, ops can be made more efficient and hardware utilization can be high in such implementations.

Another approach to coding an AI network, which allows for more platform flexibility, is to make the kernels hardware agnostic, where the code is adapted or modified depending on hardware platforms which may be used to run the AI network. This approach works similarly to how a high-level programming language, for example C++ or the like, are written generically and a variety of compilers and run-time processors, or pre-processors make the appropriate conversions for the code to run on a given hardware platform. The disadvantage with this approach is that substantial gains in efficiencies can be lost in exchange for making the AI network code generic or hardware agnostic.

One solution to address the undesirable trade-off between efficiency versus code portability is to use microkernels in implementing the kernels as Applicant has described in another provisional application, entitled "Microkernel-Based Neural Network Optimization". For each hardware platform, a small number of microkernels (e.g., 2-4 in some implementations) can be coded. Each microkernel is written with hardware-specific instruction sets (using e.g., x86 intrinsics, assembly for x86 Intel Skylake, CUDA for NVIDIA® GPUs). Each microkernel supports multiple input/output data formats (layouts) to further help with end-to-end optimization. From the outside user's perspective, microkernels for different hardware platforms look and behave identically. The "API" for these microkernels is identical, but what changes is the number of input data streams, and the actual mathematical operations executed e.g., addition, multiplication, fused multiply-add etc.). Subsequently, higher-level ops (such as convolution, matrix multiplication, etc.) are written in a way that can use these microkernels. The op itself is oblivious to the internal implementation of the microkernel.

Figure 1:
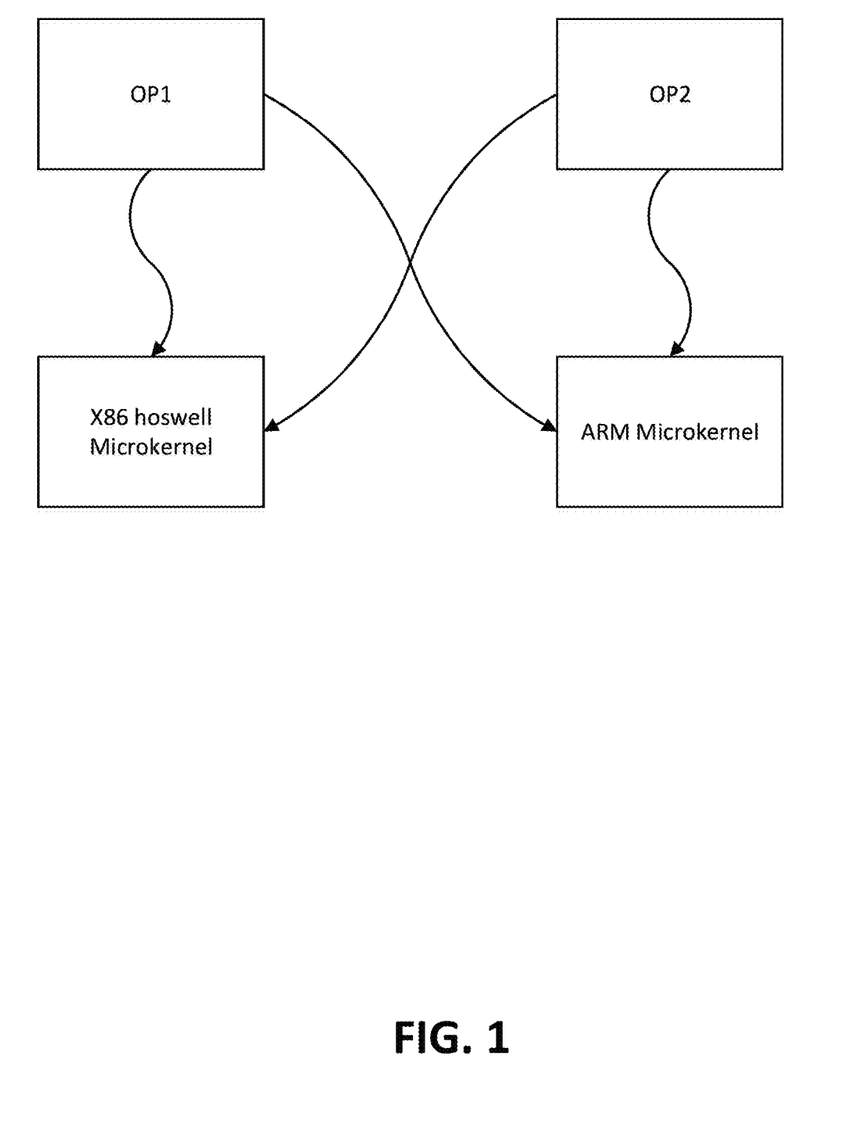
FIG. 1 illustrates a diagram of an example implementation of microkernels.

FIG. 1 illustrates a diagram of an example implementation of microkernels. Two example hardware platforms x86 and ARM are shown, but other hardware platforms are also possible. One or more microkernels corresponding to a given hardware platform can be used to implement operations of a neural network, for example, Op1 and Op2, depending on which hardware is to execute the operations. In this manner, efficiencies of hardware-specific implementation can be accomplished, while the higher-level definitions of a neural network operations (like convolution, etc.) can be hardware independent.

Kernels and microkernels can be programmed to implement (for a hardware platform) one or more operations of the neural network, comprising building block operations or more complex operations. Example operations of a kernel or microkernel can include, additions, multiplications, etc. or more complex operations, like matrix multiplications or convolution. More complex operations may be implemented with one or more microkernels.

In terms of dataflow within an AI network, and for efficiency and standardization purposes, kernels receive input data in a predetermined input data format, process the input data according to the operations they implement and output data in a predetermined output data format. For example, some kernels receive input and output data in one of two input/output data formats. For a four-dimensional input/output, the input/output data format can be NCHW for GPUs and NHWC for CPUs (with "N" denoting "batch size," "C" denoting "channel," "H" denoting "height" and "W" denoting "width").

In some embodiments, the system can embed, within the data format, actual weights (i.e., the actual numerical values) into the generated code. This can provide further flexibility with respect to the memory layout. For example, a consumer electronics company may wish to increase their System-on-Chips ("SoC") utilization, where one neural network and model are applied to a CPU and GPU on a single chip. The present system can ensure that different data formats and embedded weights are generated, even for the same neural network and model for the CPU and the GPU on the same system on a chip.

Figure 2:
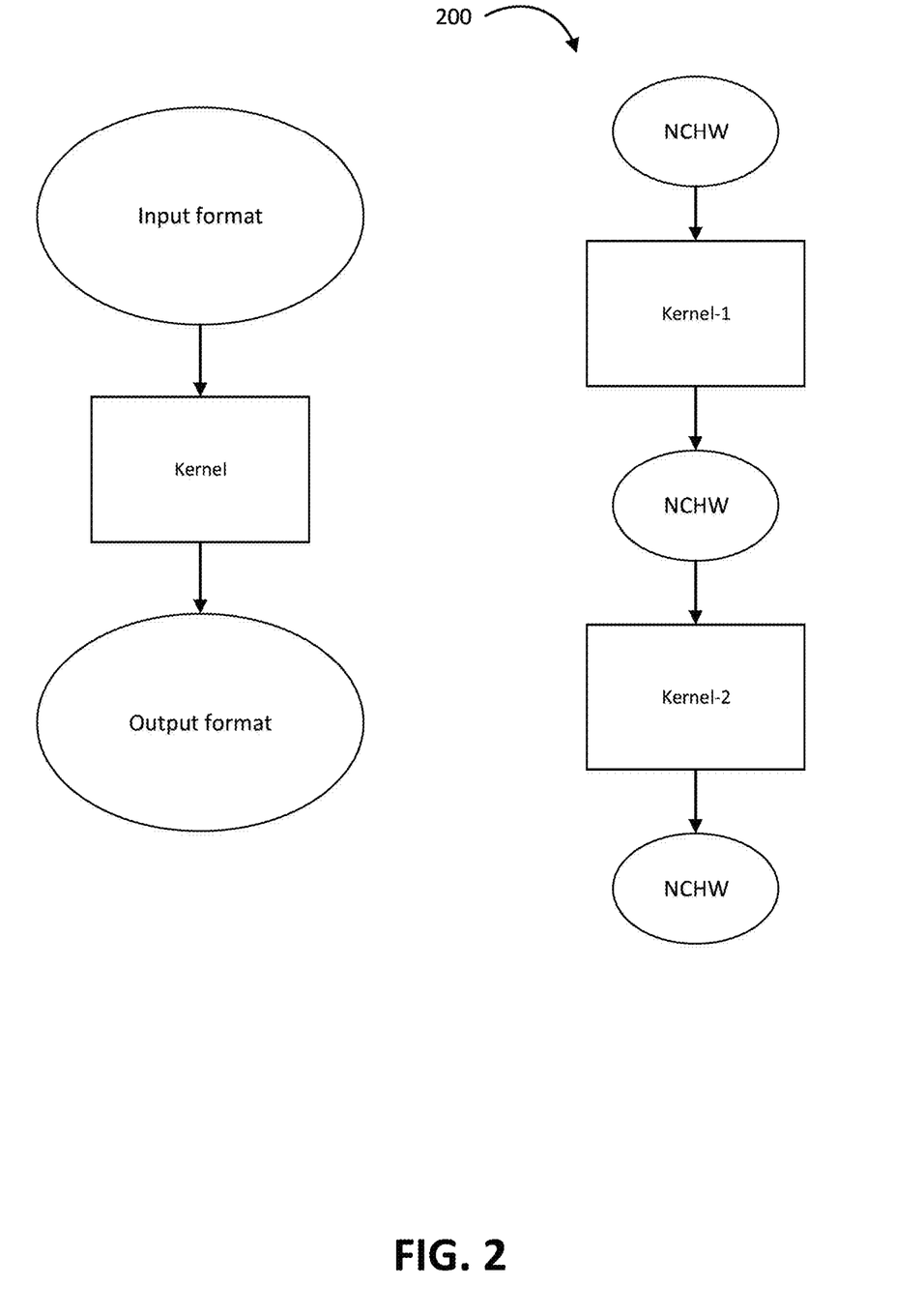
FIG. 2 illustrates an example data flow between one or more kernels of an AI network, where the input/output data format is of NCHW format.

FIG. 2 illustrates an example data flow between one or more kernels of an AI network 200, where the input/output data format is of NCHW. For example, the kernels shown can be written and optimized for GPU operations. One issue with a rigid input/output data format requirement is that some kernels can potentially be written to be some or several orders of magnitude more efficient if they were allowed to receive input data format in another data format than the hardware platform for which they were initially written (e.g., NHWC as opposed to NCHW or vice versa). The AI network 200 can include many more kernels that are not shown.

As described, supposing the AI network 200 is implemented with input/output data format NCHW. Kernel-1 and kernel-2 are, therefore, part of an implementation of the AI neural network 200 in which input/output data format NCHW is used. However, it can be the case that kernel-2 can be written to be several orders of magnitude more efficient if it could receive inputs in NHWC format (while the output of kernel-1 which is fed to kernel-2 is in NCHW format). To address this issue one or more transpose modules can be used.

Figure 3:
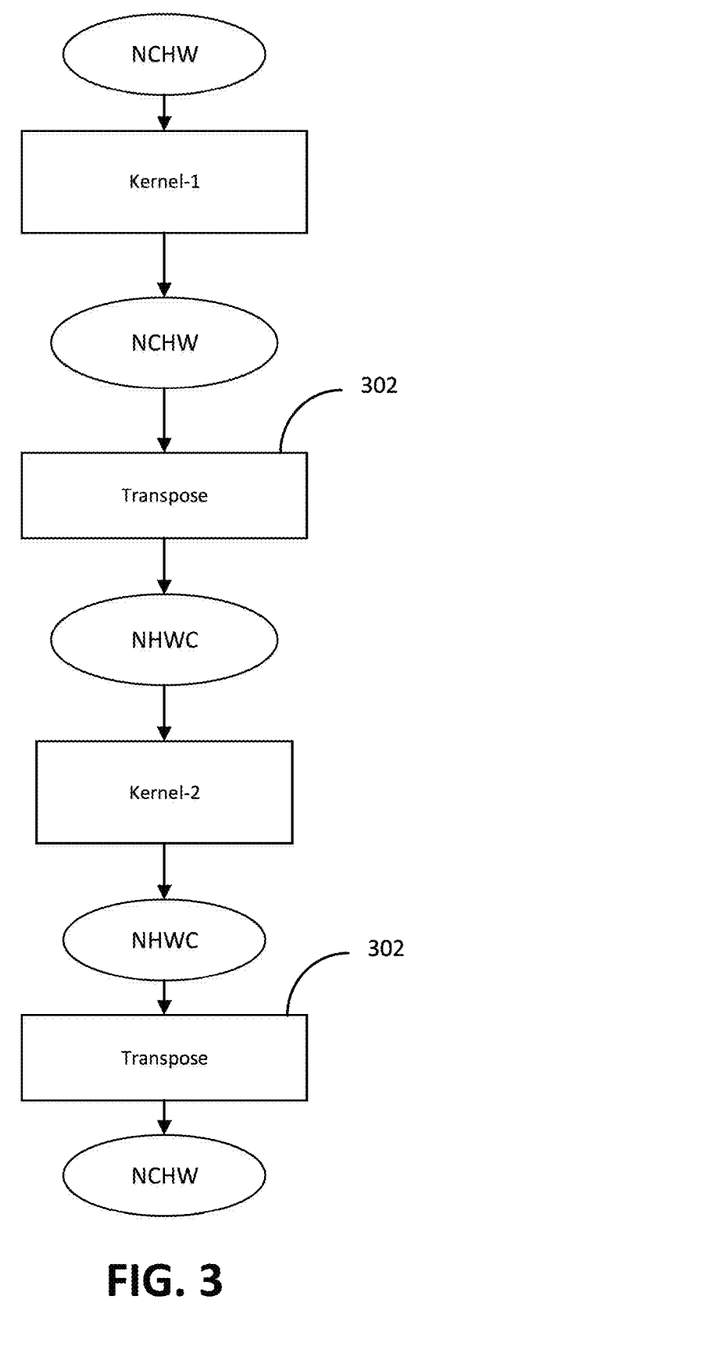
FIG. 3 illustrates an implementation of a portion of the AI network of the embodiment of FIG. 2, in which one or more transpose modules are used to convert input/output data formats for some kernels, so those kernels can operate more efficiently.

FIG. 3 illustrates an implementation of a portion of the AI network 200 in which one or more transpose modules 302 are used to convert input/output data formats for some kernels, so those kernels can operate more efficiently. For example, if kernel-2 can be written to operate more efficiently if it can operate in NHWC format, then transpose modules 302 can convert the input and output of kernel-2, so kernel-2 can receive input in NHWC format and output in NHWC format while the rest of the network 200 can feed into and from the kernel-2 in NCHW format. However, transpose modules and operations iterate over the entire input blob (or output blob depending on the implementation, which can be time-wise expensive, especially for large input sizes or memory-bound operations. In other words, to use some kernels efficiently, one has to introduce transpose modules, which can degrade the AI network performance. For example, considering that input data in typical AI workloads can be several hundreds or thousands of rows and/or columns wide, rearranging the data in a transpose module in order to convert its format can degrade the functionality of an AI network.

This problem can be in part due to the code for a kernel having been written and deployed for a specific hardware platform. For example, if a first data format (e.g., NHWC) happens to be an efficient way overall to implement a kernel for a particular platform, that kernel is always encoded and deployed with that data format, and consequently, there may not be an equivalent kernel for a second data format (e.g., NCHW).

While use of transpose modules can address the AI network code portability issues, as described above, its use can also introduce inefficiencies in performance of the AI network. To address this undesirable trade-off and achieve code portability as well as hardware-specific efficiency, one or more kernels or microkernels can include or can be embedded with postprocessors and/or preprocessors which can perform input/output data conversion on the fly. In some embodiments, instead of or in addition to data conversion, the preprocessors or post processors can populate an input/output data structure as the underlying data for the data structure is being generated by a previous kernel/microkernel (in the case of a preprocessor) or by the kernel/microkernel (in the case of a postprocessor). In other words, in some embodiments, pre or postprocessors eliminate the need for data conversion, instead they generate an efficient input/output data structure dynamically and in the first instance, as opposed to generating an intermediary data structure and then subsequently converting the intermediary data structure to a more efficient data structure.

Figure 4:
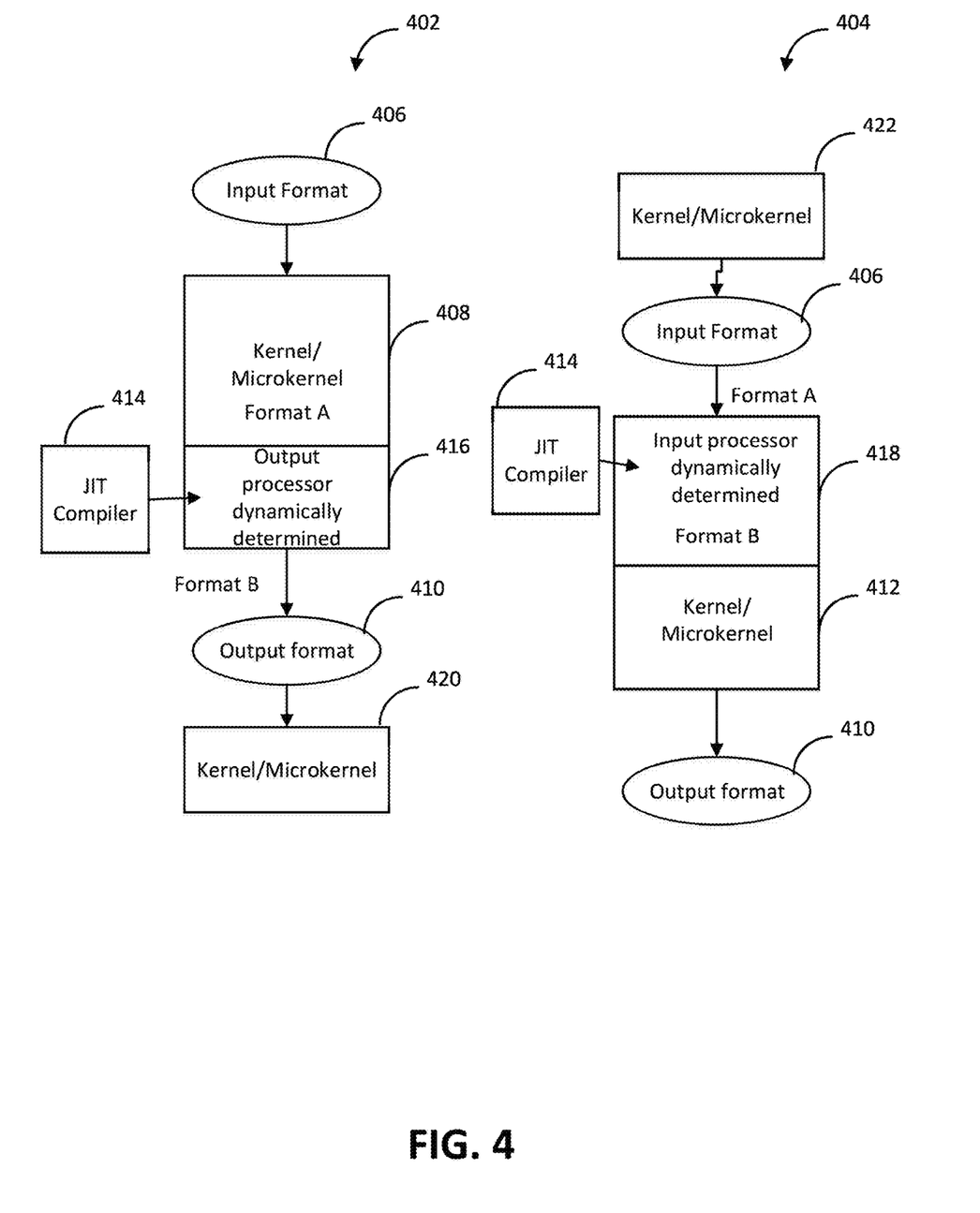
FIG. 4 illustrates the operations of embedded preprocessors and postprocessors in relation to kernels (or microkernels if used) and the input/output data format of the kernel (or microkernel if used).

FIG. 4 illustrates the operations of embedded preprocessors and postprocessors in relation to kernels (or microkernels if used) and the input/output data format of the kernel (or microkernel if used). Diagram 402 illustrates the operation of a dynamic output processor or post processor 416 and diagram 404 illustrates the operation of a dynamic input processor or preprocessor 418. In diagram 402, kernel 408 can accept input format 406 and generate output format 410, which is digested by a subsequent kernel 420. Kernels 408 and 420 can be microkernels or can include a plurality of microkernels. It can be the case that kernel 408 is written to generate output in format A, but subsequent kernel 420 can run more efficiently if it can receive input in format B. A just-in-time (JIT) compiler 414 can determine the efficient data format B and generate a corresponding postprocessor 416. The post processor 416 can generate the output format 410 in format B as the kernel 408 processes and outputs its output data stream. In other words, instead of kernel 408 building the output format 410 in format A, the postprocessor 416 builds the output 410 in format B as the kernel 408 generates its output data stream.

The JIT compiler 414 can generate the postprocessor 416 depending on a variety of factors. For example, depending on the hardware on which the kernels 408 and 420 are going to be executed, e.g., CPU, GPU, tensor processing unit (TPU), etc. the nature of input requirements of subsequent blocks or according to factors based on optimization of neural network which kernels 408 and 420 may be a part of. For example, the Applicant has described an end-to-end optimization of a neural network in another provisional application, entitled "End-to-End Network Optimization for Neural Networks,", which can utilize the embodiments of postprocessors 416 and preprocessors 418, as described herein. In some embodiments, the JIT compiler 414 can generate a variety of postprocessors 414 depending on which output format 410 is more efficient and plug a corresponding postprocessor 416 into kernel 408 or compile the kernel 408 with a corresponding postprocessor 416. The term, "plug in" can refer to the JIT compiler 414 embedding the kernel 408 at execution time with a postprocessor 416 code, which can receive the output stream of kernel 408 as it is being generated or in portions, and generate and/or populate the output data format 410 in a format that is efficient or desirable for a subsequent kernel 420.

The operations of the preprocessor 418 is similar to the operations of the postprocessor 416, except that those operations are done for the input data stream which are digested by kernel 412. While not shown, in some embodiments a kernel (or a microkernel if used) can include both preprocessor 418 and postprocessor 416 embedded by JIT compiler 414. The embodiments of postprocessor 416 can be more efficient or desirable in some implementations as generating input data stream on the fly can increase hardware idle time as the hardware awaits the generation of the remainder of input data stream. In other words, in some implementations, having latency in the output is more efficient than having latency in the input. As a result, postprocessors 416 can be more desirable and are used in these implementations.

As described earlier, preprocessors and postprocessors can be implemented in embodiments, where kernels or microkernels or a combination of them are used. For example, kernels 408, 420, 422 and 412 can alternatively be microkernels or a combination of kernels and microkernels. Various combinations and permutations of kernels and microkernels using pre and postprocessors within an implementation of an AI network can exit and are possible, where some microkernels can be part of a kernel and other microkernels can be part of a different kernel. Consequently, the described embodiments of pre and postprocessors are applicable and can be used with both kernels and microkernels depending on the desired implementation.

Figure 5:
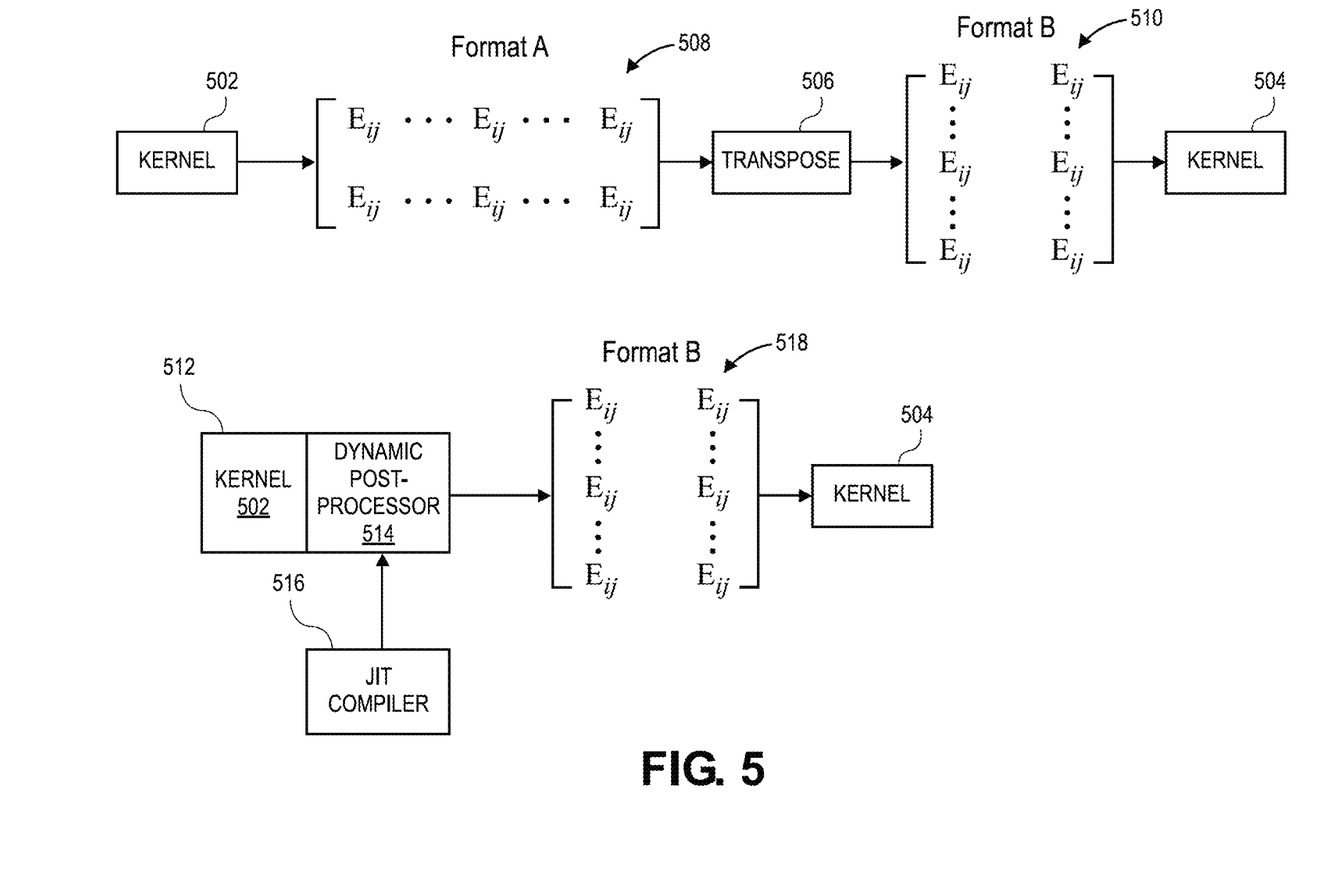
FIG. 5 illustrates a comparison of the operations of a neural network when a kernel of the neural network is compiled and implemented with or without an embodiment of a postprocessor.

FIG. 5 illustrates a comparison of the operations of an AI network when a kernel of the AI network is compiled and implemented with or without an embodiment of a postprocessor. The output of kernel 502 is digested by a second kernel 504. The kernel 502 outputs data in format A, while kernel 504 can be more efficient if it receives input in format B. For brevity of description, in the illustrated example, format A and format B are both matrix formats with only rows and columns switched between the two formats. However, a variety of other formats and conversions can exist between the structure of each format. For example, in practical applications format A may be NCHW while format B may be NHWC or vice versa.

A transpose module 506 receives the output data structure 508 of kernel 502, when the output data structure 508 is generated (typically in full). The transpose module 506 then builds an output data structure 510 in format B by shifting elements, moving rows or columns or by a variety of operations depending on the nature of the output data structure 508 and formats A and B. The output data structure 510 is then digested by the second kernel 504. By contrast, kernel 512 is kernel 502 embedded with a postprocessor 514. A JIT compiler 516 can detect, at run-time and dynamically, that the second kernel 504 can be more efficient if it can receive input data in format B. The JIT compiler 516 can embed the kernel 502 with a postprocessor 514 corresponding to format B, where the postprocessor 514 is configured to receive the output stream of the kernel 502 (as individual elements or a plurality of them are generated) and populate an output data structure 518 in format B. Compared to the operations, where a transpose module 506 is used, when a postprocessor 514 dynamically generates the output data structure 518 in format B, generation of the intermediary output data structure 508 and its subsequent transpose operations can be eliminated. In both cases, the second kernel 504 receives its input in format B, but in the postprocessor case, the output data structure 518 is generated more efficiently (by avoiding having to generate an intermediary output data structure 508 and transposing it). In other words, both output data structures 510 and 518 are the same, but the output data structure 518 is generated more efficiently, as described above.

Figure 6:
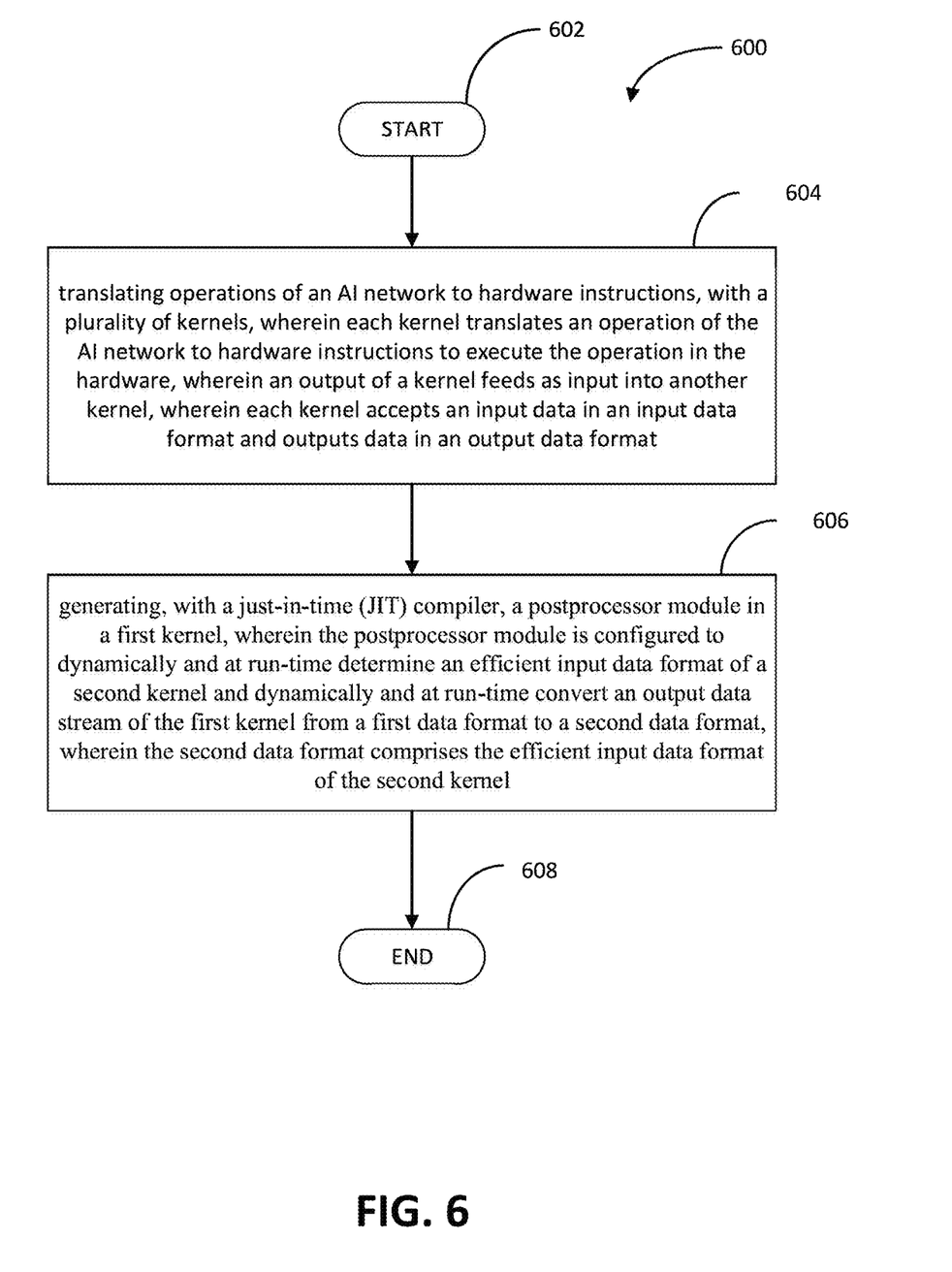
FIG. 6 illustrates a computer-implemented method of compiling AI network code to hardware instructions according to an embodiment.

FIG. 6 illustrates a computer-implemented method 600 of compiling AI network code to hardware instructions according to an embodiment. The method starts at step 602. The method continues to step 604 by translating operations of an AI network to hardware instructions, with a plurality of kernels, wherein each kernel translates an operation of the AI network to hardware instructions to execute the operation in the hardware, wherein an output of a kernel feeds as input into another kernel, wherein each kernel accepts an input data in an input data format and outputs data in an output data format. The method continues to the step 606 by generating, with a just-in-time (JIT) compiler, a postprocessor module in a first kernel, wherein the postprocessor module is configured to dynamically and at run-time determine an efficient input data format of a second kernel and dynamically and at run-time convert an output data stream of the first kernel from a first data format to a second data format, wherein the second data format comprises the efficient input data format of the second kernel. The method ends at step 608.

While some embodiments are described in relation to kernels, those techniques can also apply to microkernels. For example, input data passed to a kernel can be received by a microkernel of a kernel, where an efficient input data format can be desirable. Additionally the flexibility gained by the ability to use pre or postprocessors to accept different input/output data formats can enable the JIT compiler to choose a kernel or hardware implementation of a kernel which is more efficient for the overall AI network flow or the hardware in which the AI network is to be executed. In other words, dynamically and at run-time the JIT compiler can package a combination of an efficient kernel and an efficient pre or postprocessor.

In alternative embodiments, in lieu of or in addition to a JIT compiler, an ahead of time (AOT) compiler can also be used to generate kernels or microkernels embedded with preprocessors and postprocessors, as described above.

What is claimed is:

1. A computer-implemented system of compiling AI network code to hardware instructions, the system comprising one or more processors configured to perform the operations of:
    translating, via a plurality of kernels, operations of an artificial intelligence (AI) network to hardware instructions, wherein each kernel translates an operation of the AI network to hardware instructions to execute the operation in the hardware, wherein an output of a kernel feeds as input into another kernel, and wherein each kernel accepts an input data in an input data format and outputs data in an output data format;
    generating, via a just-in-time (JIT) compiler, a postprocessor module in a first kernel, wherein the postprocessor module is configured to dynamically and at run-time determine an input data format of a second kernel and dynamically and at run-time convert an output data stream of the first kernel from a first data format to a second data format, and wherein the second data format comprises the input data format of the second kernel; and
    via each of a plurality of postprocessor modules plugged into one or more kernels, receiving the output stream of a kernel and populating a data structure in a data format compatible with input data format of a subsequent kernel, wherein the plurality of postprocessor modules are configured to optimize end-to-end execution of the neural network on the hardware.

2. The system of claim 1, wherein converting dynamically and at run-time comprises the postprocessor module populating an output data structure with the output data stream of the first kernel in the second data format as the first kernel generates the output data stream and/or partial output data stream, wherein the second data format comprises the input data format of the second kernel.

3. The system of claim 1, wherein determining the input data format of a second kernel is at least partly based on determining the hardware on which the hardware instructions are to be executed.

4. The system of claim 1, wherein the hardware comprises a central processing unit (CPU), graphical processing unit (GPU), or tensor processing unit (TPU).

5. The system of claim 1, wherein the data formats comprise num_samples×height×width×channels (NHWC) or num_samples×channels×height×width (NCHW).

6. The system of claim 1, wherein the kernels comprise a plurality of microkernels or the kernels are microkernels.

7. The system of claim 1, wherein the AI network comprises a neural network.

8. A computer-implemented system of compiling AI network code to hardware instructions, the system comprising one or more processors configured to perform the operations of:
    translating, via a plurality of kernels, operations of an artificial intelligence (AI) network to hardware instructions, wherein each kernel translates an operation of the AI network to hardware instructions to execute the operation in the hardware, wherein an output of a kernel feeds as input into another kernel, and wherein each kernel accepts an input data in an input data format and outputs data in an output data format;
    generating, via a just-in-time (JIT) compiler, a preprocessor module in a first kernel, wherein the preprocessor module is configured to dynamically and at run-time determine an output data format of a second kernel and dynamically and at run-time convert an output data stream of the second kernel from a first data format to a second data format, and wherein the second data format comprises the input data format of the first kernel; and
    via each of a plurality of preprocessor modules plugged into one or more kernels, receiving the output stream of a kernel and populating a data structure in a data format compatible with input data format of a subsequent kernel, wherein the plurality of preprocessor modules are configured to optimize end-to-end execution of the neural network on the hardware.

9. The system of claim 8, wherein converting dynamically and at run-time comprises the preprocessor module populating an input data structure with the output data stream of the second kernel in the second data format as the second kernel generates the output data stream and/or partial output data stream, wherein the second data format comprises the input data format of the first kernel.

10. A computer-implemented method of compiling AI network code to hardware instructions, the method comprising:
    translating operations of an artificial intelligence (AI) network to hardware instructions, with a plurality of kernels, wherein each kernel translates an operation of the AI network to hardware instructions to execute the operation in the hardware, wherein an output of a kernel feeds as input into another kernel, wherein each kernel accepts an input data in an input data format and outputs data in an output data format;
    generating, with a just-in-time (JIT) compiler, a postprocessor module in a first kernel, wherein the postprocessor module is configured to dynamically and at run-time determine an input data format of a second kernel and dynamically and at run-time convert an output data stream of the first kernel from a first data format to a second data format, wherein the second data format comprises the input data format of the second kernel; and
    via each of a plurality of postprocessor modules plugged into one or more kernels, receiving the output stream of a kernel and populating a data structure in a data format compatible with input data format of a subsequent kernel, wherein the plurality of postprocessor modules are configured to optimize end-to-end execution of the neural network on the hardware.

11. The method of claim 10, wherein converting dynamically and at run-time comprises the postprocessor module populating an output data structure with the output data stream of the first kernel in the second data format as the first kernel generates the output data stream and/or partial output data stream, wherein the second data format comprises the input data format of the second kernel.

12. The method of claim 10 further comprising generating a plurality of postprocessor modules and embedding them in one or more kernels, wherein each postprocessor is configured to receive the output stream of a kernel and populate a data structure in a data format compatible with input data format of a subsequent kernel, and wherein the plurality of postprocessors are configured to optimize end-to-end execution of the neural network on the hardware.

13. The method of claim 10, wherein determining the input data format of a second kernel is at least partly based on determining the hardware on which the hardware instructions are to be executed.

14. The method of claim 10, wherein the hardware comprises a central processing unit (CPU), graphical processing unit (GPU), or tensor processing unit (TPU).

15. The method of claim 10, wherein the data formats comprise num_samples×height×width×channels (NHWC) or num_samples×channels×height×width (NCHW).

16. The method of claim 10, wherein the kernels comprise a plurality of microkernels or the kernels are microkernels.

17. The system of claim 1, wherein an ahead of time (AOT) compiler, instead of the JIT compiler, is configured to generate and plug the postprocessor module in the first kernel.

18. The system of claim 8, wherein an ahead of time (AOT) compiler, instead of the JIT compiler, is configured to generate and plug the preprocessor module in the first kernel.

19. The method of claim 10, wherein an ahead of time (AOT) compiler is used in lieu of the JIT compiler.

* * * * *